Patented Aug. 14, 1951

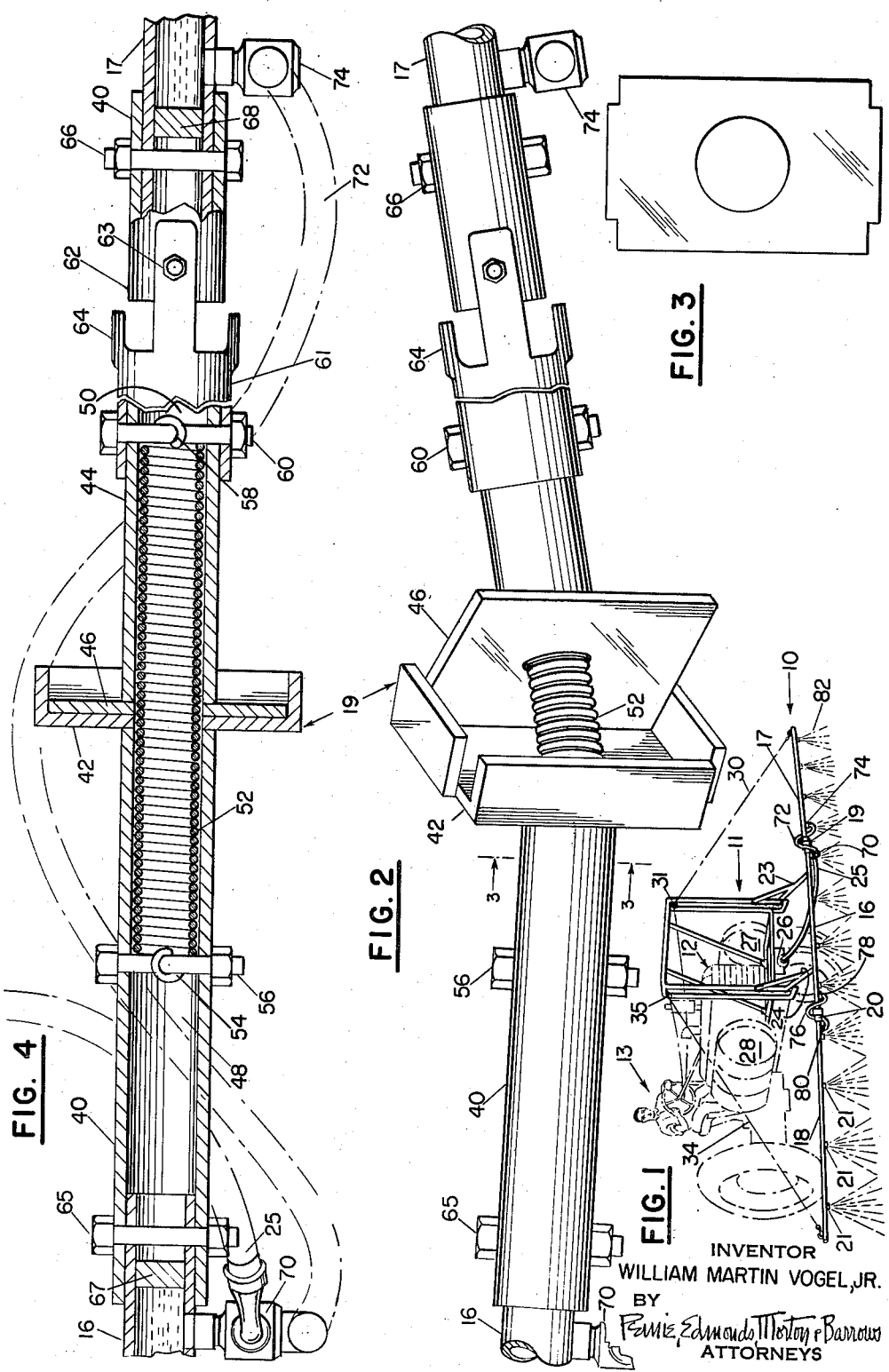

2,564,041

UNITED STATES PATENT OFFICE 2,564,041

FLEXIBLE HINGE FOR BOOM SPRAYERS

William M. Vogel, Jr., Mendham, N. J., assignor to Standard Container Inc.

Application September 3, 1948, Serial No. 47,711

3 Claims. (Cl. 287—99)

This invention relates to liquid spraying devices and has for its object certain improvements in their construction. The invention relates more particularly to hinges that are particularly useful in connection with the use of such liquid spraying devices.

Among the highly effective liquid sprayers used in agricultural pursuits, particularly to combat insects, weeds, fungus, etc., is that of a long transverse hollow spraying boom supported at the front or rear of a tractor. The boom itself is usually in the form of three intercommunicating pipe sections, having an overall length of, for example, eighteen feet. The two end sections are hinged to the ends of the midsection so that the end sections may be raised or lowered angularly with respect to the midsection.

As a result of my investigations, I have discovered that the hinges between the pipe sections may be so modified in construction as substantially to lessen the chances of damaging the boom when striking an obstacle of the kind usually encountered in such spraying operations. Whereas with the prior hinge construction between the pipe sections, the operator must in general act before one of the boom ends strikes the obstacle, thus limiting his time to act, with the hinge construction of my invention he may often act after the boom end strikes the obstacle, thus extending his time to act. This difference in time is frequently all that is necessary to prevent damage. In many instances the operator need not act at all because the boom end can surmount successfully the obstacle and no damage takes place. The boom end may, for example, ride over or under the obstacle, or it may in effect be bent backwardly in sufficient amount to pass the obstacle without damage.

In accordance with the invention, one of the pipe sections of the boom terminates in a stop plate-sleeve member and another pipe section terminates in a hollow socket-sleeve member. The stop plate-sleeve member extends into the open end of the hollow socket-sleeve member and the passageways of the two sleeves communicate and are normally in alignment with one another. A coil spring is mounted within the communicating passageways of the two sleeves, the ends of the coil spring being secured to their respective sleeves so that the two members and the coil spring are joined as a flexible unit and one member and its associated pipe section may be moved relatively to the other member and its associated pipe section when the coil spring is placed under lateral tension.

In a presently preferred practice of the invention, the hollow socket is sufficiently deep to accommodate continuously at least a portion of the stop plate as the members and their associated pipe sections are moved relatively to one another so that the stop plate and the hollow socket may cooperate to guide the sleeves and their associated pipe sections into alignment when the lateral tension is released from the coil spring. Also the stop plate and the hollow socket are normally in sufficient surface to surface contact to help keep the sleeves and their associated pipe sections in alignment when the lateral tension is released.

The construction is such that when a boom end strikes an obstacle the spring is placed under lateral tension and the boom is free to yield horizontally as well as vertically, or generally in any direction made necessary by the obstacle. This yielding may be sufficient for the boom end to surmount the obstacle or to give the operator time to raise or lower the boom end or to stop the tractor before any damage occurs.

These and other features of the invention will be better understood by referring to the accompanying drawing, taken in conjunction with the following description, in which:

Fig. 1 is a diagrammatic view in perspective of a spraying device illustrative of a practice of the invention, showing a long transverse spraying boom supported by a tractor;

Fig. 2 is an enlarged perspective view of one of the hinges connecting the midsection and an end section of the boom;

Fig. 3 is a view on the line 3—3 of Fig. 2; and

Fig. 4 is for the most part a sectional view of the hinge.

Referring to the drawing, Fig. 1 shows a boom 10 suitably secured to a bracket 11 mounted on the front end of a tractor 12 in control of an operator 13. The boom comprises a mid pipe section 16 and end pipe sections 17 and 18 connected to the midsection by means of hinges 19 and 20, respectively. The pipe sections are provided with a plurality of perforations or nozzles 21. The mid pipe section is secured to the bracket by means of a pair of extension arms 23 and 24.

A flexible feed line 25 connects the mid pipe section with pump 26, which is in turn connected to drums 27 and 28 containing the liquid to be sprayed through the boom. The pump is operated by a power take-off (not shown) suitably connected to the engine of the tractor.

The far end of end pipe section 17 is fitted with a pull line 30 passing through a pulley 31 at the top of bracket 11 to the operator so that he may raise and lower the end section angularly with respect to the fixed midsection. In a similar manner end section 18 is fitted with a pull line 34 passing through a pulley 35 at the top of the bracket to the operator so that he may raise and lower that end section.

Referring next to Figs. 2 and 4, it will be seen that hinge 19 is shown in some detail and is, of course, also illustrative of hinge 20. The hinge comprises a half portion formed of a sleeve 44 integrally secured to a stop plate 46, and another half portion formed of a sleeve 40 integrally secured to a hollow socket 42. Passageway 48 of sleeve 40 and passageway 50 of sleeve 44 communicate with one another and are normally in alignment. A coil spring 52 is mounted in and extends a substantial distance through the two passageways, thus uniting the two half portions. One end 54 of the spring is bent around and held by a bolt 56 extending transversely through sleeve 40. The other end 58 of the spring is similarly bent around and held by a bolt 60 extending transversely through sleeve 44. In their normally aligned position stop plate 46 fits tightly against the inside of hollow socket 42. In the particular construction shown both the plate and the socket are rectangular in shape thus providing flat surfaces for interface contact. The plate fits loosely within the hollow space of the socket so that it may move freely therein, as will be described below. To this end the socket is in the form of an open box with bottom and side walls. While the plate and socket shown are rectangular they may, of course, be in any other convenient shape, such as circular. In any case, it is preferable to have them large enough to provide adequate surface to surface contact to help keep the sleeves in normal alignment. The coil spring itself is preferably under substantial tension normally to help keep the plate and socket in surface to surface contact.

In present practice the hinge just described is used in conjunction with the usual yoke hinge referred to above. To this end sleeve 44 terminates in a bifurcated yoke 61 pivotally secured to a reenforcing sleeve 62 by a bolt or fin 63. The yoke is provided with a stop bumper 64 for the latter sleeve when it is raised.

Mid pipe section 16 fits into the end of sleeve 40; the two being positively secured to each other by means of a bolt 65. End pipe section 17 fits into the end of sleeve 62 a substantial distance, the two being positively secured to each other by means of a bolt 66. As more particularly shown in Fig. 4, a plug 67 is provided in the passageway of mid pipe section 16 near its end and a similar plug 68 is provided in the passageway of end pipe section 17 near its end. The plugs confine the liquid to the pipe sections and prevent its escape through the hinge.

As better shown in Fig. 4, flexible feed line 25 connects with a nipple 70 in turn connected to mid pipe section 16, so that liquid may be passed from drum 27 or 28 thereto. The lower end of the nipple connects with a flexible conduit 72, such as a piece of rubber hose, which spirals completely around joint 19. The other end of the flexible conduit connects with a nipple 74 in turn connected to end pipe section 17. In this manner liquid from drum 27 or 28 may pass through feed line 25 and flexible conduit 72 into the passageway of end pipe section 17 by by-passing entirely joint 19.

A similar arrangement is provided at joint 20 so that liquid from mid pipe section 16 may be passed into end pipe section 18. To this end, as shown in Fig. 1, a flexible conduit 76 connects at one end to a nipple 78 in mid pipe section 16. The flexible conduit spirals around the joint and is connected at the other end to a nipple 80 in end pipe section 18.

The far ends of the boom are plugged or otherwise closed. Liquid from drum 27 or 28 may be supplied to the boom throughout its entire length by the single feed line 25.

The spraying device of the invention may be operated as follows:

The boom is adjusted on the tractor to the desired height depending, of course, on the height of the plants to be treated. Assuming, for example, that a liquid insecticide is to be sprayed on relatively low plants, the boom is adjusted to a height parallel to the ground adapted to throw the spray effectively. Drum 27 or 28 is connected to pump 26 so that the liquid is forced through feed line 25 into end pipe section 17 through flexible conduit 72 and into mid pipe section 16, and through flexible conduit 76 into end pipe section 18. The pump is adjusted to deliver the liquid to nozzles 21 at a desired pressure and the nozzles are in turn adjusted to give the desired spread of spray. As the tractor advances a plurality of liquid sprays 82 is spread on the underlying plants.

If end pipe section 17 is approaching an obstacle, such as a bush of greater height than the plants being treated, the operator may draw on pull line 30 to lift the end section and thus avoid striking the bush. If he fails to act in time and the end section strikes the bush, hinge 19 will open as indicated in Fig. 2. This permits the end pipe section to yield horizontally, for example, thus giving the operator further time in which to raise it by drawing pull line 30. In some cases the amount of horizontal yielding may be sufficient for the end section to clear the bush. In any event, the boom is saved from damage.

In its normal position the boom is substantially parallel to the ground and the hinges are in the position indicated in Fig. 4, stop plate 42 being in face to face engagement with hollow socket 46. When, however, end pipe section 17 of the boom strikes the obstacle, its alignment with fixed mid pipe section 16 is broken and coil spring 52 is placed under added tension. As the end section yields the plate and socket open up as indicated in Fig. 2. The plate tends to pivot within the hollow socket. The rear portion of the plate is retained within the four walls of the socket. When the boom clears the obstacle, end pipe section 17 returns to its normal position in alignment with mid pipe section 16, thus bringing the stop plate and socket back in the position indicated in Fig. 4.

The construction of the hinge is such that the end pipe section may be moved relatively to the mid pipe section at any angle. By means of pull line 30 the end section can be raised or lowered angularly in a generally vertical plane. In striking an obstacle head on, the end section tends to move angularly in a generally horizontal plane. The end section may of course move angularly in any other plane. The hinge construction disclosed may in general be regarded as a universal joint or hinge. It is well adapted to serve the operator under a variety of situations met during spraying operations.

The construction shown is only by way of example and it will be clear to those skilled in this art that in practice the invention readily lends itself to numerous modifications.

I claim:

1. In a spraying device having a long transverse hollow spraying boom formed of intercommunicating hinged perforated pipe sections of the type described, the improvement which comprises a pipe section terminating in a flat plate, another pipe section terminating in a second plate constructed with raised edges in the form of a hollow socket, the first plate extending into the open end of the hollow socket, a coil spring mounted between the pipe sections, the ends of the coil spring being secured to their respective pipe sections so that the flat plate and socket are flexibly joined and the flat plate and its associated pipe section may be moved relatively to the socket and its associated pipe section when the coil spring is placed under lateral tension.

2. In a spraying device having a long transverse hollow spraying boom formed of intercommunicating hinged perforated pipe sections of the type described, the improvement which comprises a pipe section terminating in a flat plate, another pipe section terminating in a second plate constructed with raised edges in the form of a hollow socket, the first plate extending into the open end of the hollow socket, and spring means flexibly joining said plates in surface to surface contact so that the flat plate and its associated pipe section may be moved relatively to the socket and its associated pipe section when the spring means is placed under lateral tension.

3. In a double-acting hinge, the improvement comprising a pipe section terminating in a flat plate, another pipe section terminating in a second plate constructed with raised edges in the form of a hollow socket, the first plate extending into the open end of the hollow socket, spring means flexibly securing said plates in surface to surface contact so that the flat plate and its associated pipe section may be moved relatively to the socket and its associated pipe section when the spring means is placed under lateral tension.

WILLIAM M. VOGEL, Jr.

REFERENCES CITED

The following references are of record in the file of this patent:

UNITED STATES PATENTS

| Number | Name | Date |
| --- | --- | --- |
| 2,273,344 | Black et al. | Feb. 17, 1942 |